United States Patent [19]
Newton

[11] Patent Number: 5,417,524
[45] Date of Patent: May 23, 1995

[54] TUNNEL TRACK-PNEUMATIC CONDUIT SYSTEM

[75] Inventor: Stanley L. Newton, DeBary, Fla.

[73] Assignee: Newton and Harrington, Inc., Debary, Fla.

[21] Appl. No.: 46,079

[22] Filed: Apr. 12, 1993

[51] Int. Cl.⁶ .............................................. B65G 51/03
[52] U.S. Cl. ...................................... 406/88; 406/95; 406/191; 406/193
[58] Field of Search .................. 406/193, 88, 95, 191, 406/194

[56] References Cited

U.S. PATENT DOCUMENTS 3,105,720 10/1963 Barker ................................... 406/88
5,037,244 8/1991 Newton ............................. 406/88 X
5,122,016 6/1992 Lenhart ............................ 406/88 X Primary Examiner—David M. Mitchell
Assistant Examiner—Andrew C. Pike
Attorney, Agent, or Firm—Malin, Haley, DiMaggio & Crosby

[57] ABSTRACT

A conveyor system for feeding containers along a path includes a pair of plenums located on opposite sides of the path. Each plenum has an inner wall which has apertures along the center thereof, with flanges extending from each wall to define chambers or guide channels that receive opposite ends of the container. The system further consists of rigid pneumatic conduits for delivering pressurized fluid from a centrifugal blower to the plenums. The pressurized fluid is introduced into the plenums and flows through the apertures to substantially suspend the containers in the chamber. The pneumatic conduits and the centrifugal blower are integrally associated with the dual plenums, thereby structurally enhancing the entire conveyor system.

17 Claims, 4 Drawing Sheets

TUNNEL TRACK-PNEUMATIC CONDUIT SYSTEM

BACKGROUND OF THE INVENTION

1. Field of the Invention

This invention relates to a dual plenum air-power conveyor system wherein the cans or articles are moved along the conveyor system through the use of air-powered jets, and more particularly, to an air powered conveyor system wherein the entire air delivery system is of the "hard-pipe" variety and is integrally associated with the dual plenum system, thereby structurally enhancing the entire conveyor system.

2. Description of the Prior Art

Historically, most conveyor systems have relied on belts or chains to move the articles along their way in a conventional conveyor system.

However, belts and chains are subject to breaking or stretching, and/or jamming of the articles being conveyed is commonplace. In recent years, air power systems have been developed whereby air pressure is utilized to move the articles along the conveyor system from one station to another. For example, mass movement of a plurality of containers along a conveyor system may be improved by utilizing pressurized air for raising the containers above the surface of the table to minimize friction. However, the pressurized air is typically delivered to these conveyor systems by a flex hose system connected to an external blower. The flex hose systems of the prior art present many maintenance problems, such as the hoses splitting or breaking due to harmonic vibrations and fatigue, causing a leakage of air in the conveyor system, which necessitates a shutdown of the entire system, resulting in an expensive delay in terms of lost production. Furthermore, as the articles move along the conveyor system, a point is reached wherein the article is required to be changed from a vertical orientation to a horizontal orientation or vice versa. The use of a gravity spiral has been attempted; however, it cannot maintain the speed of the remainder of the system and as a result, frequent jamming occurs. As one would expect, the jamming of a conveyor system requires that the entire line be shut down until the jam is cleared. This can be an expensive delay in terms of lost production in manhours required to clear the jam. Additionally, the frequency of the jam compounds the problem and likewise increases the overall cost.

SUMMARY OF THE INVENTION

It was with this knowledge in mind that I was motivated to design a conveyor system in which the entire air delivery system is of the "hard-pipe" variety. The apparatus consists of a pair of plenums that are located on opposite sides of the path for the cans or articles. Each plenum has an inner wall which has apertures along the center thereof. The inner walls of the plenums are spaced from each other by a substantially constant dimension which is slightly larger or greater than the length or height of the can or article being conveyed. Additionally, the width of the chamber is slightly greater than the diameter of the article and the spacing between the chambers is greater than the diameter of the article. These dimensions may be adjustable to accommodate containers of different sizes. The apparatus also includes a pair of flanges extending from opposite edges of each of the inner walls that cooperate therewith to define U-shaped channels or chambers that are designed to receive opposite ends of the articles, if necessary, and act as guides for the articles or cans. Preferably, the free ends of the flanges have wear strips made of ultrahigh molecular plastic material, the main purpose of which is to prevent scratching or marring of the cans as they pass through the conveyor system.

The apparatus also consists of frame support means integrally associated with the dual plenums. The frame support means is in the form of rigid pneumatic conduit means and blower means, thereby allowing the entire conveyor system to be of the hard pipe variety. This offers a substantial improvement over prior art systems which typically utilize a flex hose system connected to an external blower. The prior art flex hose/blower systems are a source of load to the frames that they are mounted on. The present apparatus incorporates the blower and conduits into the dual plenum system itself, becoming part of the frame, thereby reinforcing and strengthening the entire conveyor system. Furthermore, the flex hose systems of the prior art present many maintenance problems. For example, the flex hose is subject to splitting or breaking due to harmonic vibrations and fatigue, causing leaks of air in the conveyor system. As a quick fix, these holes are typically sealed with duct tape or the like. However, eventually the hose needs to be replaced, necessitating a shutdown of the entire conveyor system. In addition, the placement of flow control valves to control the pressure within the system is necessarily limited with conduits of the flex hose type.

The present apparatus utilizes an all hard pipe conduit construction, wherein each conduit is mandrel bent smooth surface rather than rippled flex hose, thereby improving air flow characteristics by reducing turbulence and static pressure within the system. Consequently, the blower associated with the system can be downsized, thereby reducing energy costs to the user, and also taking up less space in an already crowded plant. In addition, flow control valves can be placed almost anywhere within the system. Furthermore, with a hard pipe system, each bend can be custom fit to follow the unit tubing throughout the plant as part of the tunnel track, thereby making the entire conveyor system more aesthetically pleasing. In addition, the system itself is now merely a plurality of discrete segments linked together, allowing quick and easy assembly in the form of a kit when on location at a field site or plant. As previously mentioned, these discrete segments thereby become system support members rather than problem loads to the system.

Accordingly, it is a primary object of the present invention to provide a tunnel track pneumatic conduit system wherein all the conduits are of the hard pipe variety and are integrally associated with a dual plenum system, thereby structurally enhancing an entire conveyor system.

A further object of the present invention is to provide frame support means which are integrally associated with a dual plenum system, thereby providing enhanced structural support of the plenum system.

A further object of the present invention is to provide a plurality of discrete segments linked together to form a dual plenum conveyor system which can be assembled in kit form on location at a field site.

A still further object of the present invention is to provide frame support means which tracks the dual plenum system throughout the plant.

A still further object of the present invention is to provide a dual plenum conveyor system which has enhanced flow characteristics, thereby allowing the user to utilize a downsized blower.

Yet another object of the present invention is to provide a frame support means wherein maintenance is greatly reduced, thereby improving the efficiency of the entire conveyor system.

Yet still another object of the present invention is to provide a frame support means wherein flow control valves to control the pressure within the conveyor system can be placed at any location.

In accordance with these and other objects which will be apparent hereinafter, the instant invention will now become described with particular reference to the accompanying drawings.

DESCRIPTION OF THE PREFERRED EMBODIMENTS

Figure 1:
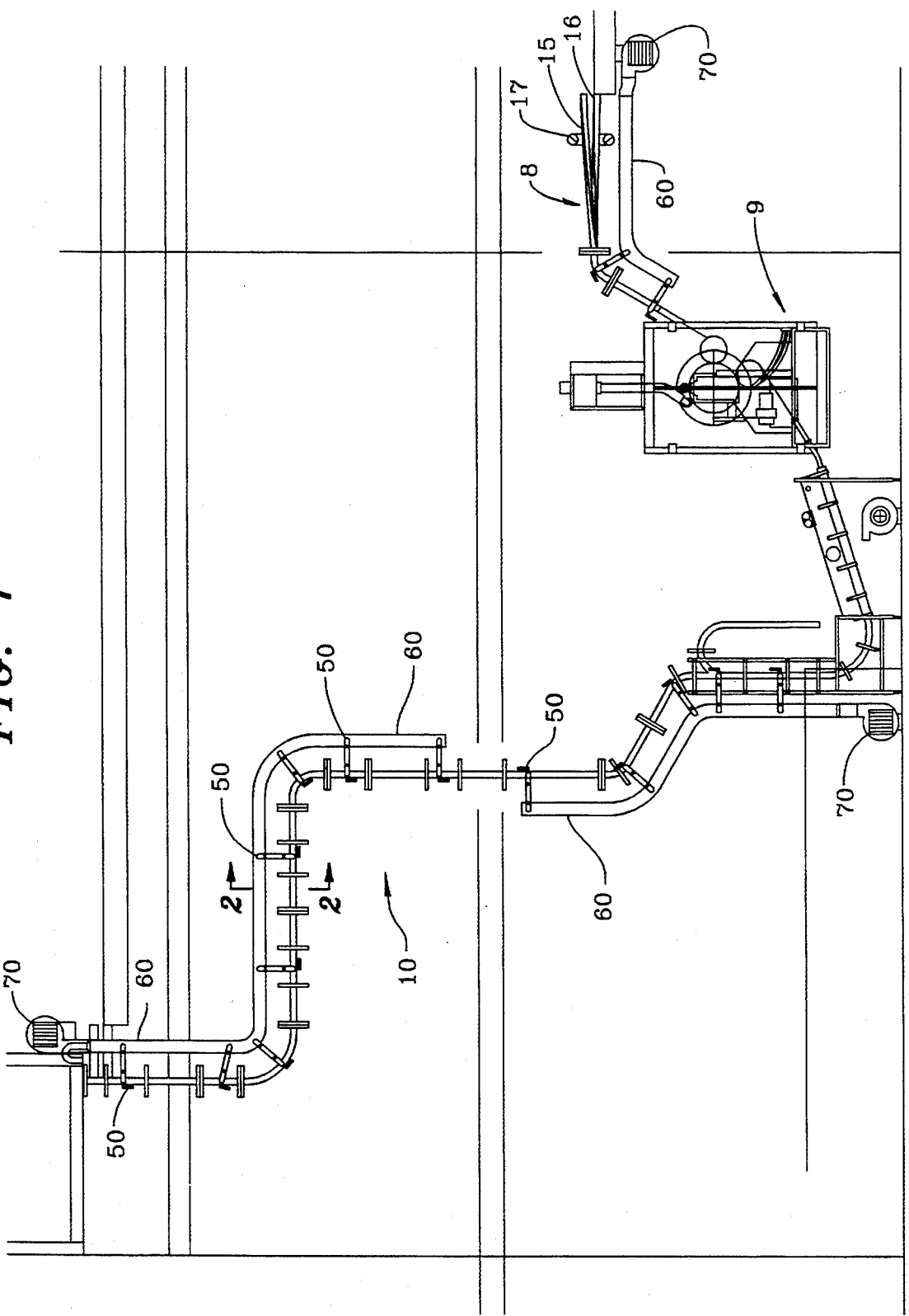
FIG. 1 is a side view of the frame support means of the present invention connected to a container processing apparatus.

Referring now to FIG. 1, there is illustrated the novel tunnel track pneumatic conduit system generally indicated by reference numeral 10. As indicated in FIG. 1, a can or like article is fed into the air power twist conveyor segment 8 in a vertical orientation at the right end thereof and due to the novel air power twist, emerges at the leftmost end thereof in a horizontal orientation; a 90° reorientation has taken place in its travel incrementally through the air power twist conveyor segment 8. The can is then passed along a path to an article processing apparatus 9, such as a printer, having pockets for receiving the articles, and wherein the articles are sequentially processed therein. It should be noted that the instant invention is equally effective with conveyor systems that do not employ an air powered twist conveyor segment.

The tunnel track pneumatic conduit system is generally designated by reference numeral 10 and includes frame support means consisting of primary rigid conduit 60, secondary rigid conduit 50, centrifugal blower 70, and upper and lower article guiding and transporting members 15 and 16, respectively. It should be noted that the aforementioned components are discrete segments which are linked together to form a system. Therefore, the system is in a kit form, wherein the various components are match marked for easy assembly on location at a plant site. The connections and interrelationship between the aforementioned components will be described in greater detail hereinafter.

Figure 2:
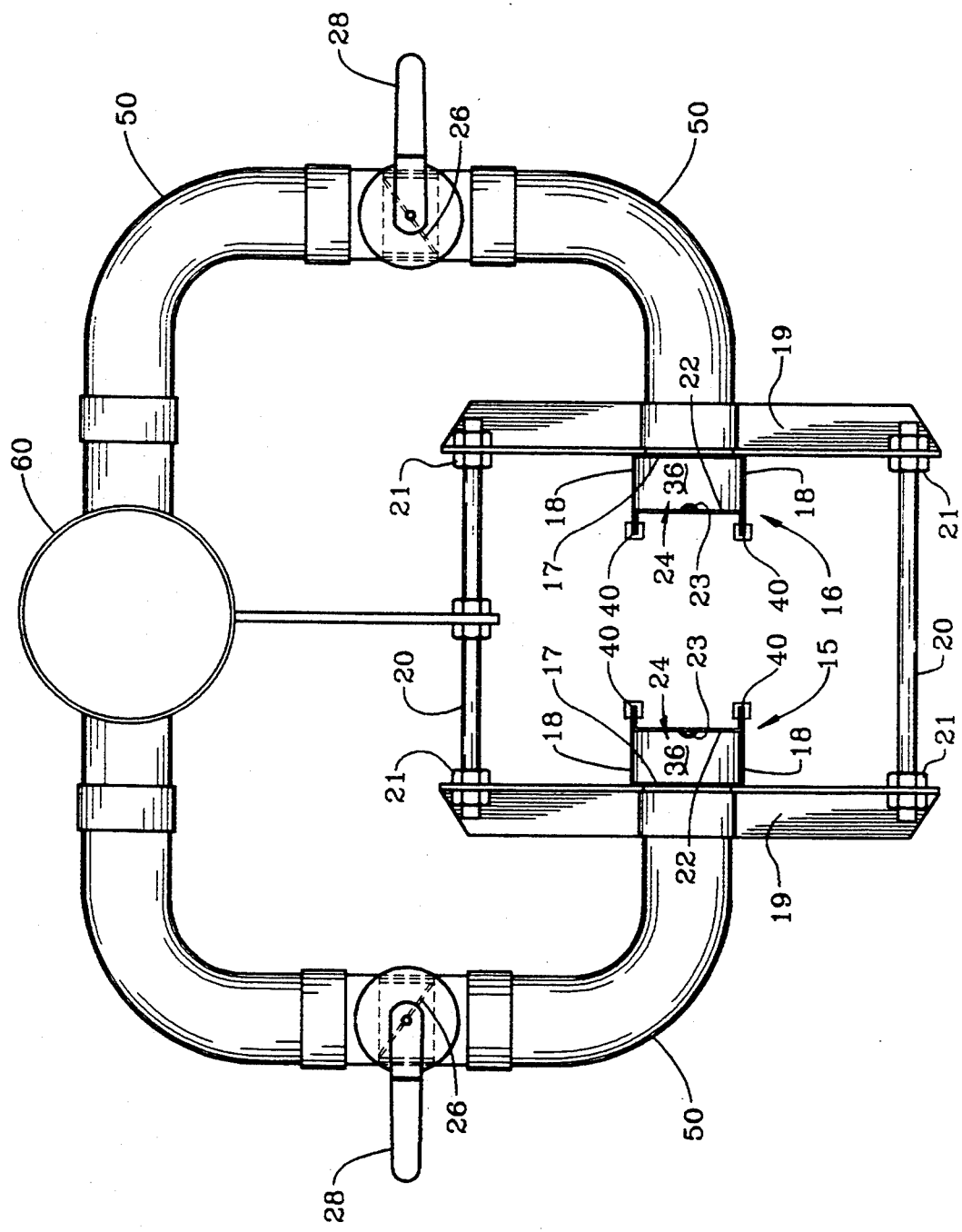
FIG. 2 is a cross sectional view, as viewed along line 2—2 of FIG. 1, with the container deleted.

As seen in FIG. 2, the tunnel track pneumatic conduit system comprises an upper can guiding and transporting member 15 and a lower can guiding and transporting member 16. Upper can guiding and transporting member 15 includes an inverted channel or U-shaped member with the open end facing downward. Top portion 17 and sides 18 form transporting member 15. FIG. 2 also illustrates the bracing and supporting structure which is required to give upper and lower members 15 and 16 the structural support necessary to permanently hold the members 15 and 16 at their required distance apart. Supporting angle members 19, which are securely attached as by weld to each of the upper and lower members 15 and 16, are fixed a given distance one from the other by a pair of adjusting screws 20. When upper and lower guide members 15 and 16 are set at their desired location, nuts 21, above and below the flange of supporting angle member 19, are tightened to insure that the desired distance will be maintained. The nuts 21 can be adjusted to vary the spacing between plenum chambers 24 to accommodate different container sizes.

Illustrated in the central portion of guides 15 and 16 is jet plate 22 which extends the full length of each of upper and lower guides 15 and 16. Jet plate 22 is provided with a plurality of spaced louver punches 23. However, jet plate 22 is also U-shaped and fits into upper and lower guide members 15 and 16 with the edges of the downwardly extending legs being flush with the downwardly extending legs of upper and lower guides 15 and 16. Jet plate 22 is welded to the legs of upper and lower guide members 15 and 16, thus forming an air plenum chamber 24 therewith, as shown in FIG. 2. Pressurized fluid, such as air, is delivered from a source (FIG. 3) such as a centrifugal blower 70, the discharge of which flows through primary rigid conduit 60, which is connected to secondary rigid conduit 50, thereby supplying air to plenum chambers 24 in upper and lower guide members 15 and 16. It is to be noted that both ends of each plenum chamber 24 are provided with end caps 36 to prevent escape of air. As depicted in FIG. 2, secondary rigid conduit 50 has an adjustable damper or control means associated therewith in the form of a butterfly valve 26 and a handle 28. Pressure gauge 17 (FIG. 1) is mounted on each transporting member 15 and 16 and is connected to the plenum means to provide a reading of the pressure therein. Handle 28 and butterfly valve 26 cooperate to control the amount of air flowing through the conduit system. It should be noted that the control means described above can be placed anywhere along either of the primary rigid conduit 60 or secondary rigid conduit 50 to control the air pressure within the plenums. FIG. 2 also illustrates wear strips 40 which are clipped onto the down-turned flanges of sides 18 and jet plate 22. Wear strips 40 are made of ultrahigh molecular plastic material and the main purpose of using these strips 40 is to prevent scratching or marring of the cans as they pass through the conveyor system 10. It is to be noted that the cans passing through the conveyor system 10 are of any type cans, such as bright, unflanged, flanged, and finished cans. Any can configuration can be used during manufacturing.

Considering now the operation of the novel conveyor system, pressurized air is delivered from centrifugal blower 70 through primary rigid conduit 60, into secondary rigid conduit 50, and pressurizes the plenums to a desired pressure. This pressurized air flows through the openings or louvers 23 which are configured to produce a vector force generally axially of the path for the container to provide a driving force for the container along the path. At the same time, since the majority of each chamber is enclosed by the containers, a slight pressure buildup occurs between the containers and the jet plate 22. This pressure buildup will have a tendency to suspend the containers in the two chambers or channels and provides buoyancy for the container. This eliminates the necessity of rolling the container along a guide rail, thereby reducing friction. In fact, there is virtually no turning of the container. Since the flow of air through the louvers 23 is directed, the pressurized air on opposite ends of the container will flow axially of the path and thereby provide a driving force to the containers in addition to a gravity force that may be applied because of the inclination of sections of the conveyor system.

While the parameters and dimensions should not be considered limiting to the present invention, some parameters will now be described. It is desirable for the spacing of the jet plates 22 to be slightly greater than the axial dimension of the container so that the container can readily be suspended on the pressurized air. Also, the spacing between the flanges, and more particularly, the inner surface of the wear strips 40, is preferably slightly greater than the diameter of the container to assure that the container cannot tilt sufficiently to jam and interrupt the flow of the containers. However, if for some reason a can should be in some orientation other than its proper vertical or horizontal alignment with upper guide 15 and lower guide 16, the can is automatically ejected from the conveyor system 10 through the "gap" which exists between upper and lower guides 15 and 16. The air exiting upper and lower jet plates 22 assists in removing the can without a jam occurring, as would be the case with a conventional conveyor system.

Figure 3:
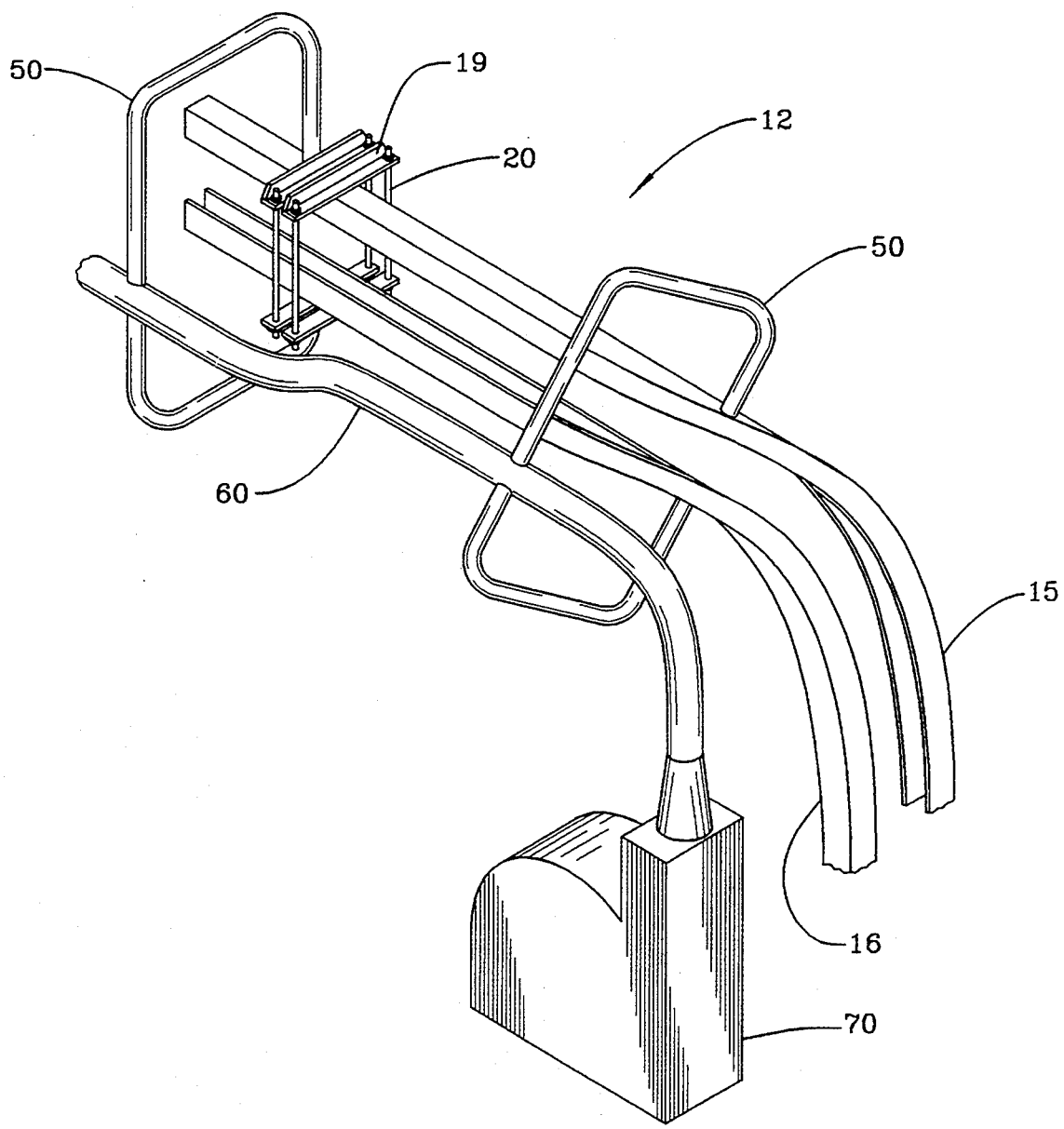
FIG. 3 is a view in perspective of the frame support means connected to a dual plenum system.

Referring now to FIG. 3, there is depicted an alternate embodiment of the frame supporting means 12, wherein the bracing and supporting structure which is required to keep upper and lower members 15 and 16 their required distance apart is shown as a separate and autonomous component rather than connected to primary and secondary rigid conduits 60 and 50, respectively, as depicted in FIG. 2.

Figure 4:
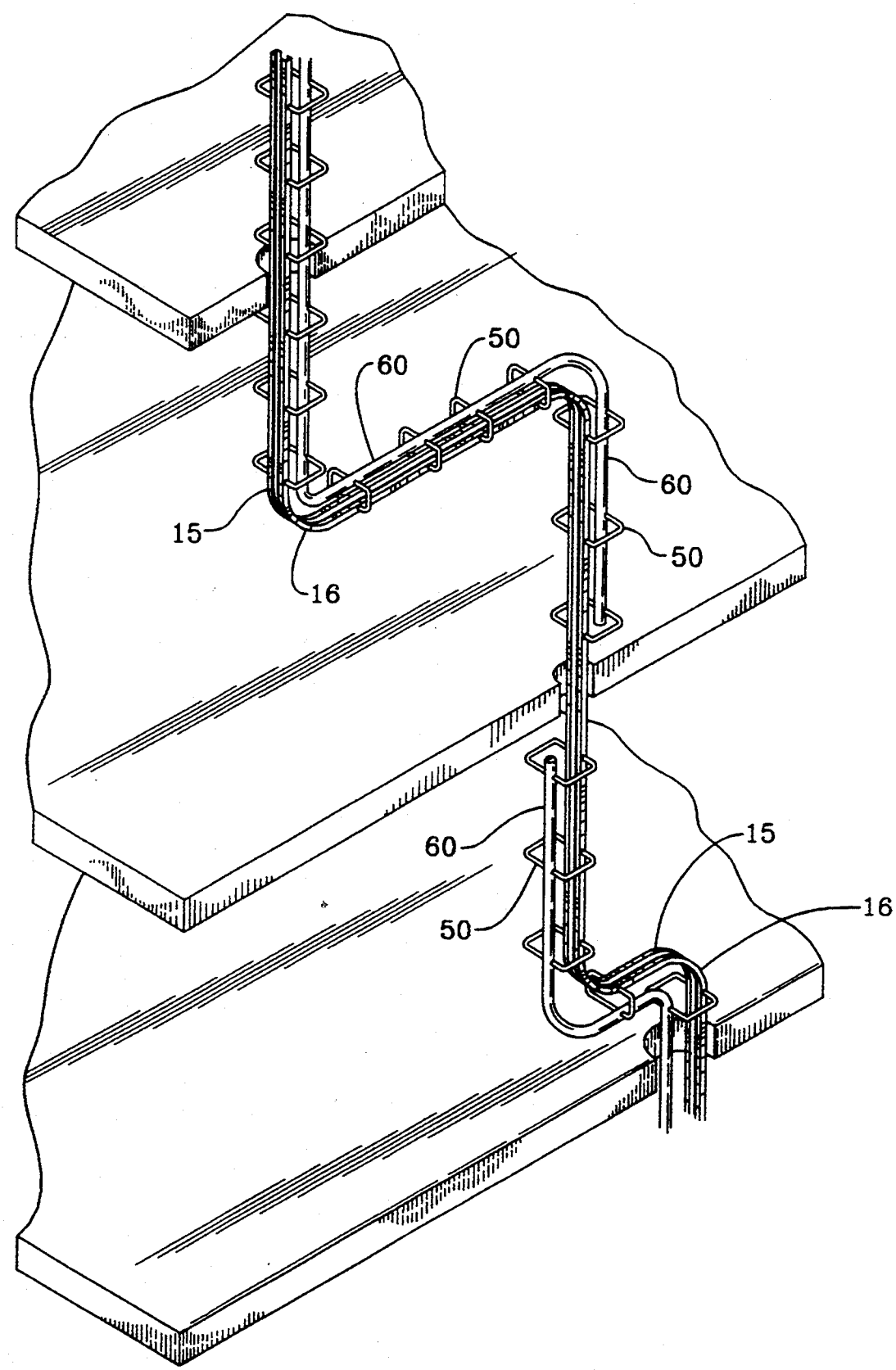
FIG. 4 is a fragmentary view showing the frame support means tracking the dual plenum conveyor system through a plant.

Referring to FIG. 4, there is an illustration of the primary and secondary rigid conduits 50 and 60 tracking through a typical canning plant. As can be readily seen, the primary and secondary rigid conduits 60 and 50 add structural support to the conveyor system, rather than adding a source of load to the frame. The rigid conduits now become part of the frame, which reinforces the strength of the entire system.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A tunnel track pneumatic conduit system for transporting articles along a path, comprising:
   opposed upper and lower article supporting and guiding means, wherein each of said upper and lower article supporting and guiding means has air plenum means for receiving air from a pressure supply means;
   jet plate means cooperating with said air plenum means to provide an air cushion to the articles being transported therein; and
   pneumatic conduit means for supporting said air plenum means, said pneumatic conduit means including at least one rigid primary pneumatic conduit and a plurality of rigid secondary pneumatic conduits, said primary pneumatic conduit being separate and spaced from said air plenum means, and generally parallel thereto, said pneumatic conduit means further including said pressure supply means, said at least one primary conduit being operably connected to said pressure supply means.

2. The tunnel track pneumatic conduit system according to claim 1, wherein said pressure supply means includes a centrifugal blower.

3. The tunnel track pneumatic conduit system according to claim 1, wherein said article supporting and guiding means further includes adjustment means for adjusting the distance between said upper and lower article supporting and guiding means, whereby articles of different sizes can be accommodated.

4. The tunnel track pneumatic conduit system according to claim 1, wherein said jet plate means comprises a generally U-shaped member operably attached to said air plenum means, said jet plate means having a plurality of spaced louver punches forming openings through said jet plate means, whereby air can exit from said air plenum means into the vicinity of the articles passing through said tunnel track system.

5. A tunnel track pneumatic conduit system according to claim 4, wherein said louver punches are centrally located in the base portion of said U-shaped member and extend the full length thereof with said louver punches extending into said air plenum means and acting as air scoops directing the air into the vicinity of the articles passing through said tunnel track system.

6. A tunnel track pneumatic conduit system for transporting articles along a path, comprising:
   opposed upper and lower article supporting and guiding means, wherein each of said upper and lower article supporting and guiding means has air plenum means for receiving air from a pressure supply means;
   jet plate means cooperating with said air plenum means to provide an air cushion to the articles being transported therein;
   friction reducing means operably connected to portions of said air plenum means and said jet plate means;
   pneumatic conduit means for supporting said air plenum means, said pneumatic conduit means including at least one rigid primary pneumatic conduit and a plurality of rigid secondary pneumatic conduits, said primary pneumatic conduit being separate and spaced from said air plenum means, and generally parallel thereto, said pneumatic conduit means further including said pressure supply means, said at least one primary conduit being operably connected to said pressure supply means; and
   pressure indicating and control means operably connected to said pneumatic conduit means for maintaining a predetermined pressure in said air plenum means.

7. The tunnel track pneumatic conduit system according to claim 6, wherein said pressure indicating and control means comprises a butterfly valve operably connected to said pneumatic conduit means and rotatable handle means for positioning said butterfly valve in its desired position to regulate the flow of air therethrough.

8. The tunnel track pneumatic conduit system according to claim 7, wherein said pressure indicating and control means further comprises a pressure gauge operably connected to said air plenum means to provide a reading of the pressure therein.

9. The tunnel track pneumatic conduit system according to claim 6, wherein said friction reducing means comprises wear strips with friction reducing properties to assist the movement of the articles and also prevent marring or scratching of the surfaces of the articles.

10. The tunnel track pneumatic conduit system according to claim 6, wherein said pressure supply means includes a centrifugal blower.

11. The tunnel track pneumatic conduit system according to claim 6, wherein said air plenum means comprises a generally U-shaped elongated member having a pair of opposed flanges interconnected by a base portion, said base portion being supported by a plurality of spaced support angle members; said jet plate means also comprising a generally U-shaped elongated member received between said opposed flanges of said air plenum means and secured thereto, thereby forming said air plenum means.

12. The tunnel track pneumatic conduit system according to claim 11, wherein said U-shaped elongated member of said jet plate means further comprises a pair of opposed flanges interconnected by a base portion, said opposed flanges of said air plenum means and said jet plate means terminating at the same point.

13. The tunnel track pneumatic conduit system according to claim 12, wherein said friction reducing means is received over the ends of said opposed flanges of said air plenum means and said jet plate means to prevent marring or scratching of the articles passing through said tunnel track system.

14. The tunnel track pneumatic conduit system according to claim 6, wherein said jet plate means further includes a plurality of spaced louver notches for permitting exit of air pressure in said air plenum means to the vicinity of passing articles in the tunnel track system.

15. A tunnel track pneumatic conduit system for transporting articles along a path, comprising:
opposed upper and lower article supporting and guiding means, wherein each of said upper and lower article supporting and guiding means has air plenum means for receiving air from a pressure supply means, said upper and lower article supporting and guiding means being incrementally twisted sufficient to cause an article which is received therebetween to be reoriented 90° while passing therethrough;
jet plate means cooperating with said air plenum means to provide an air cushion to the articles being transported therein;
friction reducing means operably connected to portions of said air plenum means and said jet plate means;
pneumatic conduit means for supporting said air plenum means, said pneumatic conduit means including at least one rigid primary pneumatic conduit and a plurality of rigid secondary pneumatic conduits, said primary pneumatic conduit being separate and spaced from said air plenum means, and generally parallel thereto, said pneumatic conduit means further including said pressure supply means, said at least one primary conduit being operably connected to said pressure supply means; and
pressure indicating and control means operably connected to said pneumatic conduit means for maintaining a predetermined pressure in said air plenum means.

16. A tunnel pneumatic conduit system for transporting articles along a path, comprising:
opposed upper and lower article supporting and guiding means, wherein each of said upper and lower article supporting and guiding means has air plenum means for receiving air from a pressure supply means;
jet plate means cooperating with said air plenum means to provide an air cushion to the articles being transported therein; and
pneumatic conduit means for supporting said air plenum means, said pneumatic conduit means including at least one rigid primary pneumatic conduit and a plurality of rigid secondary pneumatic conduits, said primary pneumatic conduit being separate and spaced from said air plenum means, and generally parallel thereto, said primary pneumatic conduit being connected to said pressure supply means, said secondary pneumatic conduit being integrally associated with said plenum means, said secondary pneumatic conduit further being disposed in a plane transverse to said plenum means, whereby said primary and secondary pneumatic conduits and said pressure supply means structurally enhance said tunnel track system.

17. The tunnel track pneumatic conduit system of claim 16, wherein said pneumatic conduct means tracks said air plenum means throughout a canning plant.

* * * * *